Feb. 19, 1929.
N. O. LINDSTROM ET AL
1,702,352
MOTOR REGULATION
Filed April 7, 1926
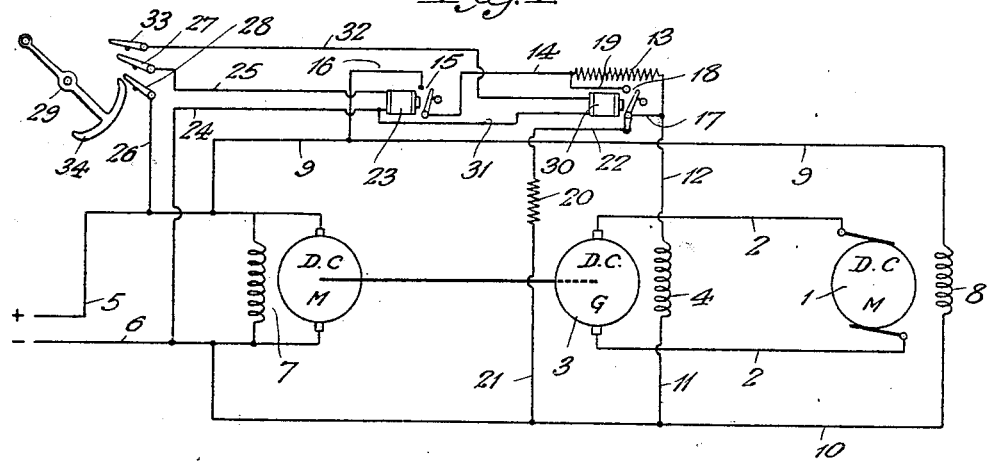
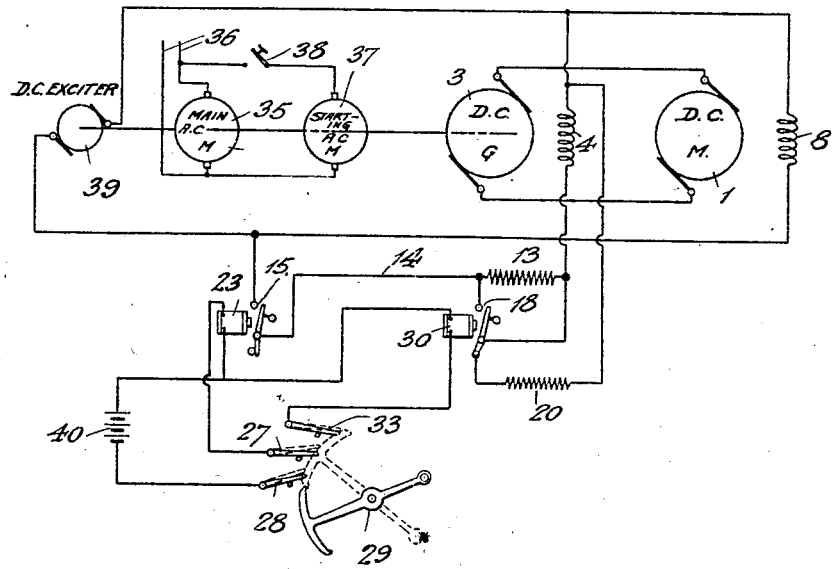
INVENTORS
NILS O. LINDSTROM
CARL F. E. OLOFSON
BY
Stockbridge & Borst
ATTORNEYS.

Patented Feb. 19, 1929.

1,702,352

UNITED STATES PATENT OFFICE.

NILS O. LINDSTROM, OF NUTLEY, AND CARL F. E. OLOFSON, OF WEST ORANGE, NEW JERSEY, ASSIGNORS TO A. B. SEE ELEVATOR COMPANY, INC., A CORPORATION OF DELAWARE.

MOTOR REGULATION.

Application filed April 7, 1926. Serial No. 100,204.

This invention relates to motors for electric elevators and the like, and particularly to a direct current electric motor which is utilized as a driving force and in which variations of speed are necessary. It has been customary to supply such a motor with current from a special generator having a separately excited field, and obtain variations in the speed of the motor by inserting, cutting out, or varying a resistance in the separately excited field. It has been found that when the resistance in the separately excited field was increased suddenly to effect a sudden decrease in current in the field, or the field circuit was opened, there was a too sudden checking or stopping of the motor, which was objectionable, particularly in passenger elevators.

An object of this invention is to provide an improved method and apparatus for controlling the separately excited field in such a manner that sudden checking of the elevator speed will be effectively prevented; with which a smooth stopping or slowing up of the motor may be obtained in a simple, effective, reliable, practical and inexpensive manner, and without material changes in present designs of such apparatus.

Various other objects and advantages will be apparent from the following description of two embodiments of the invention, and the novel features will be particularly pointed out hereinafter in connection with the appended claim.

In the accompanying drawing:—

Fig. 1 is a circuit diagram illustrating the control of an elevator motor whose speed is controlled in accordance with this invention, the apparatus utilizing a direct current source of operating current; and Fig. 2 is a similar diagram in which the operating power is alternating current.

Referring particularly to Fig. 1, the armature 1 of a direct current motor for operating the elevator or other like apparatus is connected by circuit wires 2 directly to the output side of a direct current generator 3 having a separately excited field 4. Power for the apparatus is obtained from power wires 5 and 6 which are connected directly to a shunt motor 7. The motor 7 directly operates the generator 3, such as by a direct drive. The field 8 of the elevator operating motor is connected by wires 9 and 10 to the power lines 5 and 6, so as to be uniformly excited, and therefore the speed of the elevator motor will respond directly to changes in voltage of the current received from the generator 3.

The field 4 of the generator 3 is connected at one side by a wire 11 to one of the power lines, such as through the circuit wire 10, and is connected at its other end by a wire 12 to one side of a resistance 13, which in turn is connected by a wire 14 to a switch device 15. The switch device 15 is in turn connected by a wire 16 to the other of the power lines such as through the wire 9. Therefore when the switch device 15 is closed the current from the power lines will be supplied to the field 4 through the resistance 13.

One end of the resistance 13 is connected by a wire 17 to a switch device 18. The other side of the switch device is connected by a wire 19 to the other end of the resistance 13, so that when the switch device 18 is closed the resistance 13 will be shunted by a low resistance circuit or path, which in effect eliminates the resistance 13 as an active factor, and substantially the entire power of the voltage lines will be impressed across the field 4 of the generator, which will in turn cause the maximum voltage output of the generator and through it the maximum speed of the elevator motor. When the switch device 18 is opened, the resistance 13 will be effective, and the current passing through the field 4 of the generator will be considerably decreased by an amount proportional to the value of the resistance 13. Under this condition, the voltage output of the generator will be less and consequently the speed of the elevator motor will be less.

A second non-magnetic or non-inductive resistance 20 is connected at one end to the field 4 of the generator, such as through conductors 21, 10 and 11, and at its other end is connected by a conductor 22 to the switch device 18 in such a manner that it will be connected to the wire 17 and through the latter and the wire 12 to the other side of the field when the switch device 18 is open. Thus when the switch device 18 opens the shunt across the resistance 13, the resistance 20 will be shunted across the field 4.

The switch devices 15 and 18 may be operated in any desired manner, but preferably, as usual in electric elevators, will be magnetically controlled. With such magnetic control the switch devices will be biased, such as by gravity, to positions in which they open the circuit between the power line and the field 4 and complete the shunting of the resistance 20 across the generator field. The switch device 15 may be closed by an electromagnet 23 which operates magnetically thereupon in a manner well known in the art. The magnet 23 is connected at one side by a wire 24 to one of the power lines, and through wires 25 and 26 to the other power line. The wires 25 and 26 lead to contact fingers 27 and 28 of a suitable controller 29.

The switch device 18 is operated into a position to close the shunt across the resistance 13 by the pull of an electromagnet 30, one side of which is connected by a wire 31 to the conductor 24 and thence to one of the power lines. The other side of the magnet 30 is connected by a wire 32 to a contact element 33 of the controller 29.

The controller 29 is provided with a contact brush or part 34 which, upon operation of the controller, is adapted to engage first with the finger 28 connected by wire 26 to one of the power lines, and then engage with the contact finger 27 completing a circuit to the electromagnet 23 to effect a closure of the switch device 15. Upon movement of the controller 29 to a further extent the contact brush 34 thereof will remain in contact with the fingers 28 and 27 and also will move into engagement with the contact finger 33 leading to the electromagnet 30 of the switch device 18. When this occurs both electromagnets 23 and 30 will be energized and the switch devices 15 and 18 closed. In such condition, the resistance 20 will be disconnected from the field 4.

When the controller 29 is returned to the inactive or stop position shown in Fig. 1, the brush 34 thereof will first leave the contact finger 33 and interrupt the circuit of the electromagnet 30, whereupon the switch device 18 will open and open the shunt of the resistance 13, thereby placing the resistance 13 in series with the field 4 of the generator. This is the controller position for an intermediate speed. When the shunt across the resistance 13 is open the resistance 20 will be again shunted across the field. During further return movement of the controller, the brush 34 thereof will move out of engagement with the finger 27 and open the circuit to the electromagnet 23, which will release the switch device 15 and permit movement of the latter into the open position shown in Fig. 1.

When the current in the field magnet is increased, self-induction in the field will retard the increase of current therein slightly for a few moments of time, and when the current in the field is decreased, the self-induction tends to retard the decrease of current and voltage as well known in the art. By connecting a non-magnetic or non-inductive resistance in shunt across the field 4 when its current is decreased, the period of self inductive discharge of the field will be prolonged and, therefore, the decrease in current will be more uniform and less abrupt, which will cause a more uniform and less abrupt change in the voltage of the generator, and in turn a less abrupt and more uniform decrease in the speed of the elevator motor.

By varying the value of the resistance 20, the effect of self-induction of the field 4 may be varied, and therefore by proper selection of the value of the resistance 20 a desired slowness in the rate of change of the decreasing speed of the operating motor may be obtained. When the field circuit is entirely opened, such as by the opening of the switch device 15, the resistance 20 will still be in shunt across the field, and will again become effective in prolonging or rendering less abrupt the decrease in current through the field 4 and insure a less abrupt stopping of the motor. If desired, different values of the resistance 20 may be shunted across the field with different changes in the resistance placed in the circuit of the field 4, which different resistances 20 will be connected in shunt to the field in the proper sequence, so that the desired action may be obtained. As the resistance of the shunt 20 is increased the period of inductive discharge is shortened and vice versa.

In Fig. 2 a slight modification of the invention is illustrated, wherein the power for the elevator operation is obtained from alternating current power lines. In this case the armature 1 of the direct current motor for operating the elevator is directly connected as before to the output side or armature 3 of the direct current generator having the separately excited field 4. The generator is directly driven at the desired speed by an alternating current motor 35, the latter obtaining its power from suitable power lines 36 carrying alternating current. If desired, a small alternating current starting motor 37 may be also drivingly connected to the generator, and supplied with power from the power lines 36 through a suitable switch device 38.

The field 8 of the elevator motor is directly connected to a direct current exciter 39, the latter also serving to supply current for the field 4 of the generator. Therefore, one side of the field 4 of the generator will be connected to the exciter and the other side will be connected to the resistance 13 and a switch device 18 is in Fig. 1. The resistance 13 will be connected by a wire 14 to a switch device 15, also as in Fig. 1. The current for the controller 29 instead of being drawn from the power lines as in Fig. 1, will be drawn from a suitable source of direct current 40 such as a battery. The battery 40 is connected to the controlling magnets 23 and 30 of the switch devices 15 and 18 respectively.

The switch device 15 is connected to the exciter for its source of current and the switch 18 functions as in Fig. 1. The switch device 18 when in closed position establishes a shunt across the resistance 13, as in Fig. 1, and when opened connects a second non-magnetic or non-inductive resistance 20 in shunt across the field 4, also as in Fig. 1. The operation of the apparatus shown in Fig. 2 is the same as in Fig. 1 except that in starting the small alternating current starting motor may be first employed to place the generator in operation, the main alternating current motor then cut in to take up and carry the operation of the generator, whereupon the starting motor will be disconnected. By the use of the small starting motor, economy of current in starting is obtained.

It will be obvious that various changes in the details, which have been herein described and illustrated for the purpose of explaining the nature of the invention, may be made by those skilled in the art within the principle and scope of the invention as expressed in the appended claim.

We claim:—

In an electric elevator and the like, a direct current electric motor for operating the elevator, a variable voltage generator electrically connected to said motor to operate the same and having a separately excited field, a resistance included in series with said field to decrease the field current and thereby decrease the voltage of said generator, a switch device for completing a circuit through said resistance to the field, means including a second switch device for shunting said resistance, a second resistance connected to one side of said field and to said second switch device, whereby when the latter moves to open the shunt to said first resistance, the second resistance will be connected to the other side of the field to form a shunt thereacross, whereby a sharp change in the elevator speed is avoided.

In witness whereof, we hereunto subscribe our signatures.

NILS O. LINDSTROM.
CARL F. E. OLOFSON.